(12) United States Patent
Stewart

(10) Patent No.: US 7,410,082 B2
(45) Date of Patent: Aug. 12, 2008

(54) VEHICLE RACK

(75) Inventor: Gerald Stewart, Seattle, WA (US)

(73) Assignee: Sportworks Northwest, Inc., Woodinville, WA (US)

(*) Notice: Subject to any disclaimer, the term of this patent is extended or adjusted under 35 U.S.C. 154(b) by 481 days.

(21) Appl. No.: 10/839,005

(22) Filed: May 5, 2004

(65) Prior Publication Data
US 2005/0056672 A1 Mar. 17, 2005

Related U.S. Application Data

(60) Provisional application No. 60/497,407, filed on Aug. 22, 2003.

(51) Int. Cl.
*B60R 9/00* (2006.01)
(52) U.S. Cl. .................. 224/504; 224/505; 224/512; 224/507; 224/509; 224/506
(58) Field of Classification Search .................. 224/504, 224/512, 505, 506, 507, 508, 509
See application file for complete search history.

(56) References Cited

U.S. PATENT DOCUMENTS

| | | | | |
|---|---|---|---|---|
| 5,092,503 A | * | 3/1992 | Cocks | 224/519 |
| 5,692,659 A | * | 12/1997 | Reeves | 224/536 |
| 5,884,824 A | * | 3/1999 | Spring, Jr. | 224/310 |
| 6,089,514 A | * | 7/2000 | Huang et al. | 248/99 |
| 6,648,398 B2 | * | 11/2003 | Duffy | 296/146.11 |
| 6,755,332 B2 | * | 6/2004 | Crane et al. | 224/321 |
| 6,968,986 B1 | * | 11/2005 | Lloyd et al. | 224/507 |
| 7,104,430 B2 | * | 9/2006 | Reeves | 224/536 |
| 7,264,145 B2 | * | 9/2007 | Lloyd et al. | 224/507 |

OTHER PUBLICATIONS

Thule, Inc., catalog pp. (2) from 1999 catalog.

* cited by examiner

*Primary Examiner*—Nathan J Newhouse
*Assistant Examiner*—Lester L Vanterpool
(74) *Attorney, Agent, or Firm*—patenttm.us

(57) ABSTRACT

A vehicle rack includes a non-pivotal portion and a pivotal portion. The non-pivotal portion is adapted to be mounted on a motor vehicle such as a public transportation vehicle such as a bus, a trolley, train, van, or car. The pivotal portion, when in the bicycle receiving position, includes in a preferred embodiment retractable arms to hold bicycles in place by their tires. The bicycle rack includes elements that assist in the raising of the pivotal portion from the vehicle receiving position into a stowed position and for lowering the pivotal portion from the stowed position to the bicycle receiving portion. Other elements assist in the single-handed reposition-ability.

6 Claims, 5 Drawing Sheets

10

VEHICLE RACK

BACKGROUND OF THE INVENTION

This invention relates in general to racks for carrying vehicles transportable by larger vehicles, such as motor vehicles, including tricycles, recumbents, wheelchairs, and Segways, and in particular to an improved vehicle rack having a means to assist in the raising and lowering of the rack.

U.S. Pat. No. 5,692,659 discloses a bicycle rack which is a good example of a type of vehicle rack for which the present invention can be used to great advantage. The disclosure of said patent is incorporated herewith by reference.

Vehicles used to move within shorter distances or used recreationally or as part of a fitness regime often need to be transported via motor vehicles such as by bus, trolley, train, van or car. Very often the vehicles are secured to the outside of the motor vehicles. The racks often have a stowed position and a vehicle receiving position. As the racks are made of a rugged, often heavy, material movement from the stowed position to the vehicle receiving position and vice versa can take some strength. Also, the user may have one hand occupied holding, or steadying the vehicle while attempting to reposition the rack.

In addition, as vehicle racks are modified to carry more vehicles such as bicycles, tricycles, recumbents, wheelchairs, and Segways, including multiples of each type or combinations of different vehicles, the weight of the rack can be considerable. So, in connection with a rack as disclosed in the above-mentioned patent, and also in connection with other racks, moving the rack from a stowed, upright position, to a lowered, carrying position, or from the lowered position to the upright position, can require a certain level of strength to lift the rack. While this is easily accomplished by many people, in some cases, it would be desirable to have a way to minimize the amount of strength and exertion required to move a rack between positions.

SUMMARY OF THE INVENTION

In accordance with the invention, a vehicle rack for holding a plurality of bikes and other conveyances being reversibly pivotal from a stowed position to a vehicle receiving position has an assist means for assisting in the raising of the vehicle rack from the bicycle receiving position to the stowed position and for ensuring controlled lowering from the stowed position to the bicycle receiving position. The invention also realizes an assist means to assist in raising a rack having a lowered stowed position and assist in lowering a rack having a raised vehicle receiving position. The assist means can include: at least one spring, a torsion rod, one or more gas springs, a pneumatic or other fluid power means, or other means.

The rack can be configured to include a first locking means for locking the vehicle rack in the stowed position and a second locking means for locking the bike rack in the bicycle receiving position. And the rack can be configured to include a releasing means for releasing the first and the second locking means. The first and said second locking means includes a pin and a first and second notch, the pin protrudes from one end of a rod, the rod is slide-ably connected to a pivoting portion of the bike rack. The first and second notches are rigidly connected to a non-pivoting portion of the bike rack. The first locking means is defined by the pin being slid into the first notch, the second locking means is defined by the pin being slid into the second notch. A handle is attached to a second end of the rod. The releasing means is defined by movement of the handle sliding the rod and sliding the pin out of said first or said second notches. A biasing means biases the pin into the first and said second notches. A pin guide surface holds the pin in a retracted position without requiring force on the handle while positioning the bike rack from a stowed position to a bicycle receiving position or from a bicycle receiving position to a stowed position. The release handle is spaced a grip-able distance from a rigid frame member. The rigid frame member and the release handle being disposed to allow single-handed actuation of the release handle and pivoting movement of the bike rack.

Accordingly, it is an object of the present invention to provide an improved vehicle rack for bicycles and other conveyances wherein the rack pivoting is aided by an assist means and which assists in the single-handed repositionability.

It is a further object of the present invention to provide an improved bike rack with assisted positional movement.

Another object of the present invention to provide an improved bike rack that is easily moved between stowed and unstowed positions.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
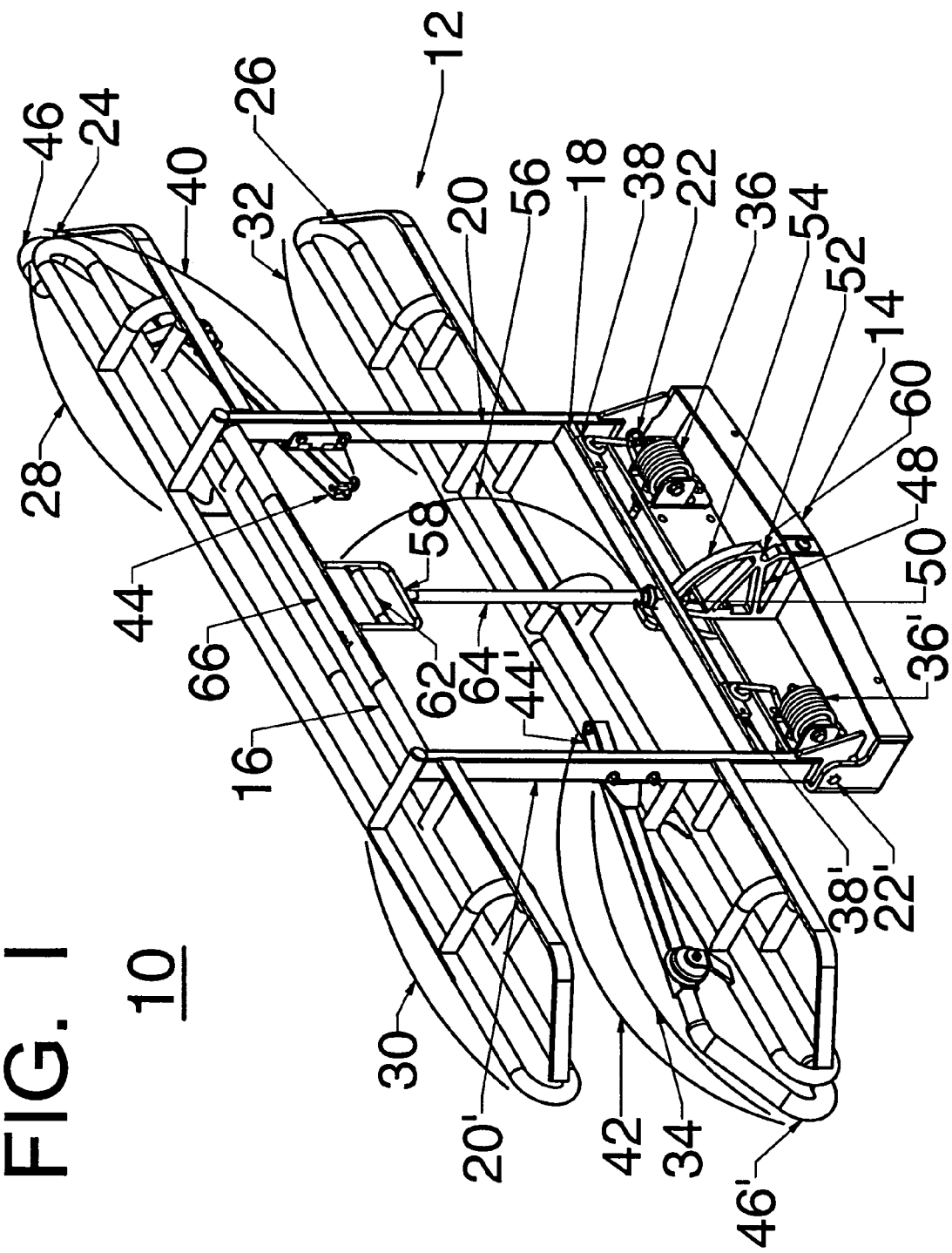
FIG. 1 is a perspective view of a bicycle rack in accordance with the invention.

Referring to the drawings and in particular to FIG. 1, a perspective view of the bike rack is shown generally by reference numeral 10 and includes a frame 12 pivotally attached to a bracket 14. The frame 12 comprises an outer cross member 16 and an inner cross member 18 rigidly connected in a parallel arrangement via right cross member 20 and left cross member 20'. Right and left cross members 20, 20' extend past the inner cross member 18 where they are connected to the bracket 14 via hinges 22 and 22'. The bracket 14 is constructed in a way to be connected to a vehicle, such as a bus, for example, by any suitable means.

Two bicycle receiving portions 24 and 26 each having two respective wheel wells 28, 30 and 32, 34 are rigidly connected to the frame 12. A biasing means in the form of springs 36 and 36' is secured to the bracket 14. The frame 12 and the bicycle receiving portions 24 and 26 pivot together from a stowed position relatively parallel with the vertical plane of the vehicle to a lowered position that is substantially perpendicular to the vertical plane of the vehicle. Springs 36, 36' comprise coil spring elements, wherein the free end of springs 36, 36' contact strike plates 38 and 38' which are secured to the inner cross member 18. The springs 36 and 36' provide an assist means for facilitating the raising of the bike rack from the lowered position to the stowed position, and for assisting in the controlled lowering of the bike rack from the stowed position to the lowered, or bicycle receiving, position.

Wheel engaging means 40 and 42 each include an arm base 44, 44' pivotally connected to respective bicycle receiving portions 24 and 26. Extensible arms 46 and 46' are slide-ably connected to each respective arm base 44 and 44', and are biased toward the respective arm bases 44, 44'. When the rack is in the lowered, or bicycle receiving position, a bicycle's tires are placed into the one pair of wheel wells for example 28 and 30. Then the wheel engaging means 40 is utilized by pivoting the base arm 44 and extending the extensible arm to fit over the bicycle tire thereby holding the wheel into wheel well 28 and the bicycle onto the bicycle receiving portion 24.

The frame 12, the bicycle receiving portions 24, 26, and the wheel engaging means are included in the pivoting portion of the bike rack. The non-pivoting portion includes a cam member 48 connected to the bracket 14. The cam member 48 includes a first notch 50 and a second notch 52 separated by a curved profile 54.

A locking and releasing means 56 extends from the outer cross member 16 to the inner cross member 18, and include a rod 58 having a pin 60 extending from a first end of the rod 58 through the inner cross member 18 into the first notch 50. A handle 62 is connected to a second end of the rod 58. The rod is slideably arranged within a sleeve 64. Not shown in the figure is a biasing means such as a spring inside the sleeve 64 which biases the pin 60 into notch 50. The rack is shown in the stowed position in FIG. 1. The handle 62 is easily gripped by a user's fingers. To put the rack into the lowered, or bicycle receiving, position the user grasps the handle and squeezes thereby sliding the rod 58 in sleeve 64 and retracting the pin 60 from first notch 50. With the user's hand still on the outer cross member 16 the pivoting portion of the bike rack is pivoted downward. The pin slides along the curved profile 54 of the cam 48 until the bike rack is in the lowered position. Thereupon, the pin will extend into the second notch 52, forced by the biasing means (not shown) and thereby locking the bike rack into the lowered position. The assist means by way of the springs 36 and 36' assist in the controlled lowering of the bike rack. To raise the bike rack from the lowered to the stowed position the user squeezes the handle 62 thereby retracting the pin 60 out of the second notch 52. With a nominal effort, aided by the springs 36, 36', the user lifts the bike rack until the pin extends into the first notch.

While the bike rack is between the stowed and lowered position the pin 60 glides along the curved profile 54 of the cam 48 so that the user need not continue to squeeze the handle thereby making it even easier to raise and lower the bike rack.

Figure 2:
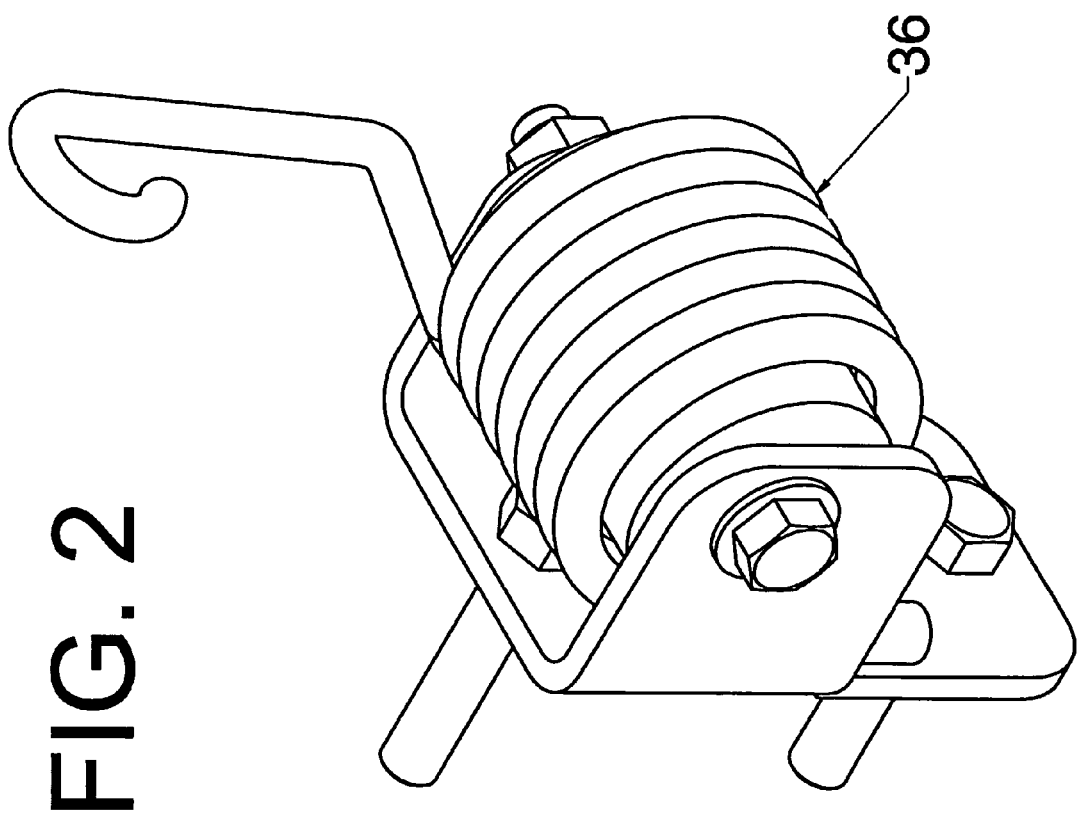
FIG. 2 is a is a perspective detail view of one embodiment of the assist means shown in FIG. 1 embodied as springs in accordance with the invention.

FIG. 2 is a perspective view showing one of the springs 36, 36' in detail.

Figure 3:
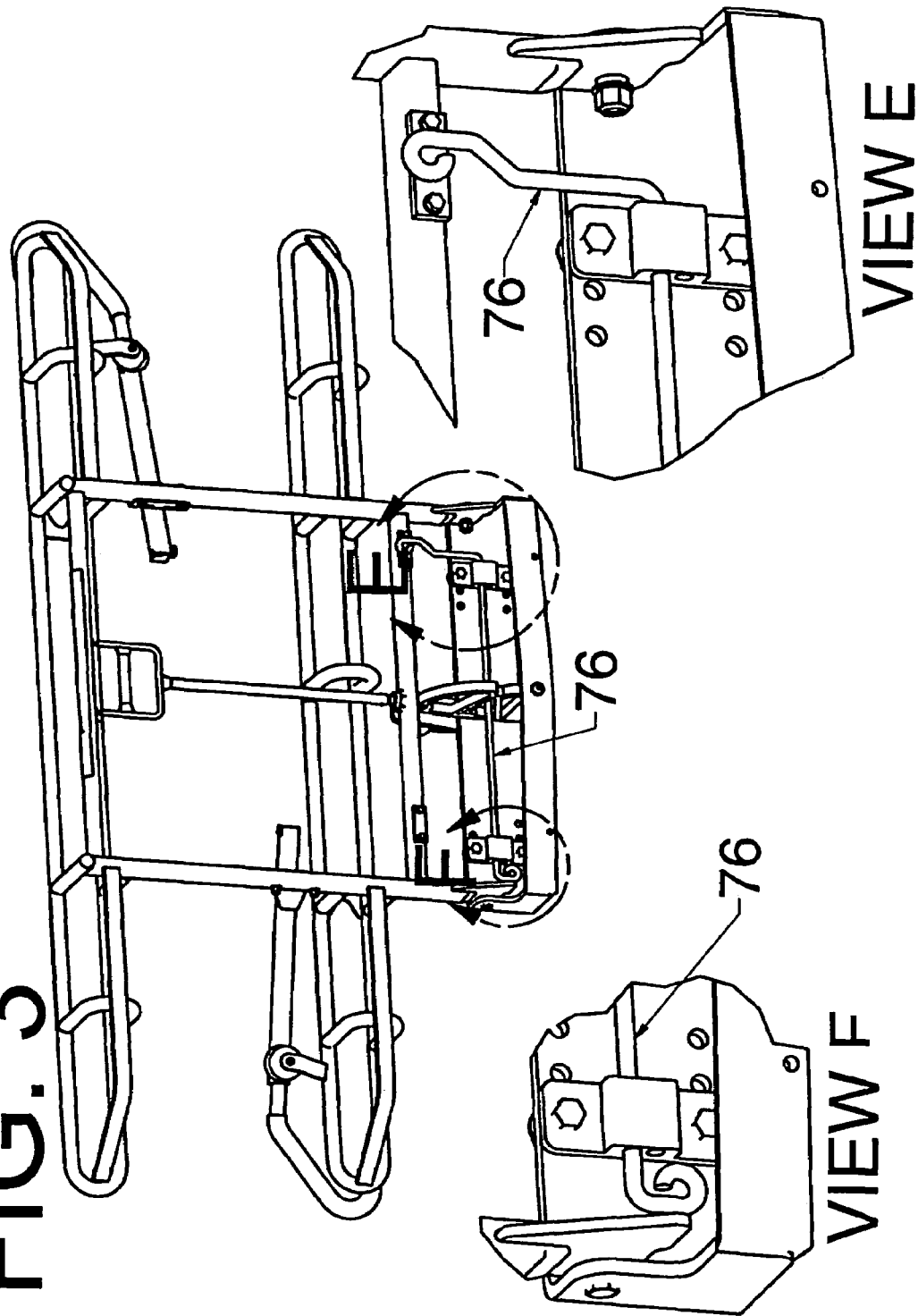
FIG. 3 is a perspective view of a bicycle rack wherein an assist means includes a torsion rod.

FIG. 3 shows another embodiment wherein the assist means includes a torsion bar 76 instead of the springs 36, 36' shown in FIG. 1.

Figure 4:
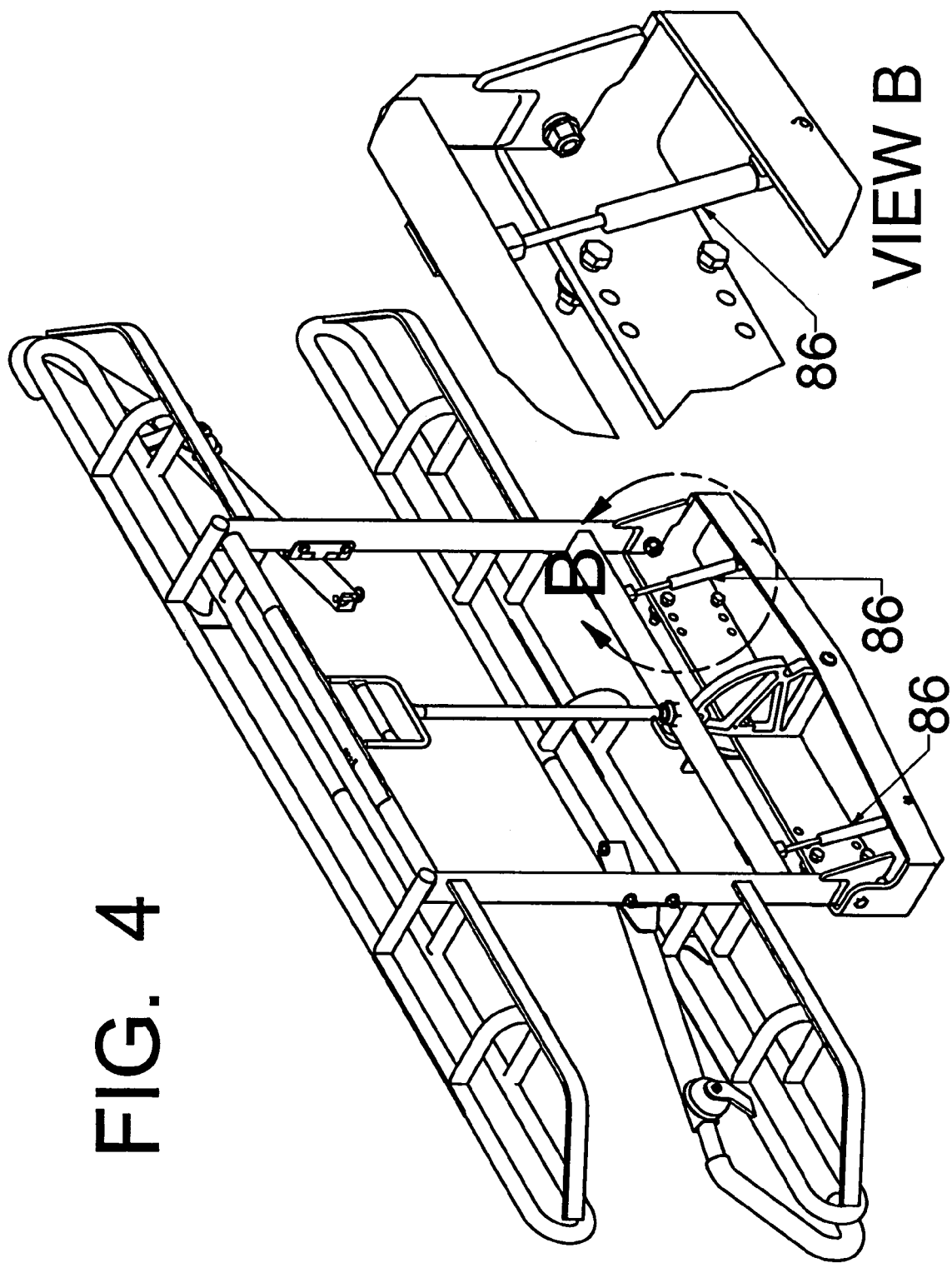
FIG. 4 is a perspective view of a bicycle rack wherein an assist means includes a gas spring, a pneumatic or other fluid powered cylinder.

FIG. 4 shows another embodiment wherein the assist means includes pneumatic cylinders 86 (or gas springs or other fluid power cylinder or device) instead of the springs 36, 36' shown in FIG. 1. Upon actuation of the release handle 62' air is allowed to slowly escape the cylinders if the bike rack is being moved from the stowed position to the lowered position. If being moved from the lowered position to the stowed position pressurized air is forced into the cylinder via a hose and compressor arrangement (not shown).

Figure 5:
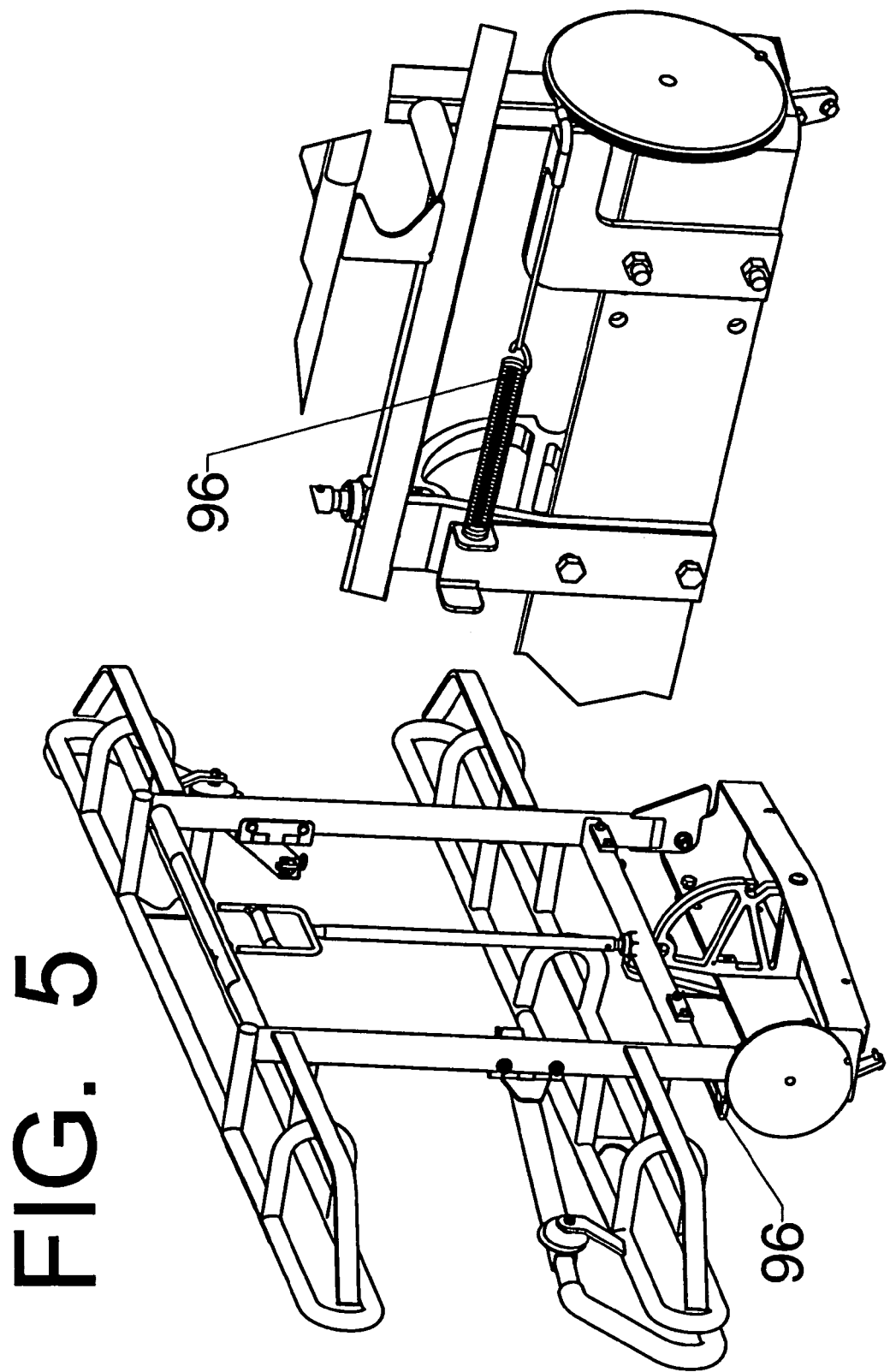
FIG. 5 is a perspective view of a bicycle rack wherein an assist means includes an extension spring.

FIG. 5 shows another embodiment wherein the assist means includes an extension spring 96 instead of the springs 36, 36' shown in FIG. 1.

Therefore, in accordance with the invention, an improved bike rack is provided, with an assistance to make raising and lowering of the rack easier. This can be especially useful in situations where the rack is much larger than the two-bike-receiving rack illustrated. Thus, for example, if the rack includes additional bike receiving positions to carry 3 or more bicycles, the assistance provided allows a relatively low effort raising and lowering of the rack.

Also, in accordance with the invention an improved vehicle rack is provided which can be configured to hold any number of conveyance types which includes an assistance to make the raising and lowering of the rack easier.

While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A bicycle rack adapted for mounting to a vehicle for securing a bicycle to the rack via contact with wheels of the bicycle and independent of contact with a frame of the bicycle, a rack frame including a first wheel well for receiving a first wheel of the bicycle, a second wheel well for receiving a second wheel of the bicycle, wherein the first wheel well and the second wheel well cooperate to engage the first and second wheels of the bicycle and substantially prevent movement of the bicycle beyond a stop position; and an extensible member for engaging the second wheel of the bicycle, the extensible member being pivotally mounted to the rack frame beneath the second wheel well, the extensible member including biasing means to urge the extensible member towards a retracted position, whereby the extensible member engages a tire of the second wheel and urges the bicycle downwardly to urge the first and second wheels into engagement with their respective wheel wells at the stop position, thereby securing the bicycle to the rack frame independent of contact with a frame of the bicycle, the rack frame being pivotal from a stowed position relatively parallel with the vertical plane of the vehicle to a lowered bicycle receiving position that is substantially perpendicular to the vertical plane of the vehicle comprising:

an assist element for assisting the raising of the bike rack from the lowered bicycle receiving position to the stowed position and for ensuring controlled lowering from the stowed position to the lowered bicycle receiving position, a first locking means for locking the vehicle rack in the stowed position and a second locking means for locking the vehicle rack in the lowered bicycle receiving position, a releasing means for releasing said first and said second locking means, wherein said first and said second locking means include a pin and a first and second notch, said pin protruding from one end of a rod, said rod slide-ably connected to a pivoting portion of the bike rack, said first and second notches being rigidly connected to a non-pivoting portion of the bike rack, said first locking means defined by said pin being slid into said first notch, said second locking means being defined by said pin being slid into said second notch, a handle attached to a second end of said rod, said releasing means being defined by movement of said handle sliding said rod and sliding said pin out of said first or said second notches, further comprising a biasing means biasing said pin into said first and said second notches, and further comprising a pin guide surface to hold said pin in a retracted position without force on said handle while positioning the bike rack from the stowed position to the lowered bicycle receiving position or from the lowered bicycle receiving position to the stowed position.

2. A bicycle rack according to claim 1 wherein the assist element includes at least one spring.

3. A bicycle rack according to claim 1 wherein the assist element includes a torsion rod.

4. A bicycle rack according to claim 1 wherein the assist element includes one or more gas springs.

5. A bicycle rack according to claim 1 wherein the assist element includes a fluid power means.

6. A bicycle rack according to claim 1 wherein said fluid power means includes a pneumatic means.

\* \* \* \* \*